Patented Jan. 7, 1947

2,413,778

UNITED STATES PATENT OFFICE 2,413,778

PRODUCTION OF TITANIUM NITRIDE

Carl Marcus Olson, Richland, Wash., assignor to E. I. du Pont de Nemours & Company, Wilmington, Del., a corporation of Delaware No Drawing. Application October 14, 1944,
Serial No. 558,740

5 Claims. (Cl. 23—191)

This invention relates to the preparation of a binary compound of titanium comprising the elements titanium and nitrogen.

The nitrides of titanium are relatively stable products since titanium has a great affinity for nitrogen. The compound, TiN, behaves as a metal in that it is a conductor of electricity and for this reason is of considerable interest. It possesses a bronze color and the combination of its metallic properties and its high melting point (about 3,000° C.) suggests its usefulness in special applications requiring conductive materials highly resistant to melting, even at extremely high or excessive temperatures.

A substantial amount of research has been conducted in the past on the production of titanium nitride, as well as on the properties of titanium nitride compositions. The production of titanium nitride containing one atom of titanium for each atom of nitrogen is well-known in the prior art, and the most economical process for obtaining that product consists in the conversion of titaniferous minerals to the nitride by heating a mixture of a titanium oxide containing ore and carbon in the presence of a stream of gaseous nitrogen at a temperature of about 1200–1300° C. Certain disadvantages reside in this process in that it is useful only in the preparation of the nitride, TiN, and the product therefrom contains the various objectionable impurities in the ore, either in a combined or elementary state, particularly iron.

The above and other disadvantages have rendered this prior method non-adapted to and unsuitable for the preparation of pure titanium nitride free from objectionable impurities, especially compounds of other metals. Furthermore, the removal of the last traces of oxygen from the product of such process has been found impractical.

The present invention has as an object the preparation of titanium nitride and particularly titanium nitride in a very high state of purity. A further object is the production of titanium nitride from a purified halide of titanium and ammonia. A still further object is the production of titanium nitride through the decomposition of the product formed upon reaction of titanium chloride with ammonia. Further objects will be found in the detailed description which follows:

These and other objects are obtained in this invention which comprises reacting a halide of titanium with anyhydrous ammonia and thereafter subjecting the resulting reaction product to decomposition by heat treatment at a temperature adequate to eliminate volatile halides and provide a solid residue of pure titanium nitride.

In one practical and specific embodiment, gaseous ammonia and gaseous titanium tetrachloride are introduced into a reaction chamber wherein they combine to form a solid reaction product having the probable formula $TiCl_4.nNH_3$. This reaction product is then decomposed by heat treatment at a temperature in excess of 1000° C., and preferably of the order of about 1100° C., for a sufficient length of time to produce the desired nitride of titanium. This high temperature treatment is carried out in the presence of gases containing nitrogen and hydrogen, and preferably a current or gaseous ammonia which becomes transformed into a mixture of nitrogen and hydrogen at the elevated temperature. The presence of these gases insures the complete removal of halogen compounds and avoids the presence of oxygen-containing substances in the final product. The composition of the final product will depend on the time and the temperature of the furnacing operation and the milder treatment will yield the nitride, $Ti_3N_4$, while more drastic furnacing conditions will yield the product TiN.

To a clearer understanding of the invention, illustrative examples are given:

Example I

Titanium tetrachloride in the liquid condition was placed in a reaction vessel and gaseous $NH_3$ was introduced into said vessel by means of a tube one end of which terminated above the surface of the liquid chloride. A reaction took place within the flask with the formation of a yellow precipitate with the evolution of much heat. When no further reaction took place, the contents of the flask were heated to and maintained at a temperature of 1050° C. until decomposition of the precipitate was complete, ammonia addition being continued to sweep any evolved gases from the flask. The heat treatment was sufficient to volatilize the ammonium chloride formed and to convert the solid material to a bronze lustrous metallic-like material. This reaction product was ground and a sample thereof analyzed for titanium. Analysis showed a titanium content of 71.46% which corresponds closely to the compound $Ti_3N_4$.

Example II

Gaseous ammonia was led into a chamber containing $TiCl_4$ in the liquid state and the addition was continued until no further heat developed.

The reaction product was placed in a combustion tube furnace, heated to 1100° C. and maintained at this temperature for one hour with a stream of ammonia gas being led through the tube while the heating was in process. The exit gases containing nitrogen, hydrogen and ammonium chloride were discarded and the furnace product was analyzed for titanium. The titanium nitride furnace residue was found to contain 72.5% titanium.

*Example III*

Nitrogen gas which had been freed of oxygen and oxides was bubbled through liquid titanium chloride and the gaseous mixture further led into a sillimanite tube, a portion of which was heated to a temperature of 1000° C. Gaseous ammonia was also led into the sillimanite tube and the two mixed in the cooler portion of the tube while the reaction product was carried into the hotter portion of the tube by the gas stream. After a reaction time of two hours, the experiment was discontinued and the cooled material removed from the tube. It was found to be titanium nitride and analyzed 64.83% titanium.

The above examples illustrate that the reaction product of ammonia and titanium tetrachloride can be obtained by combining gaseous ammonia with either liquid titanium tetrachloride or with vapors of titanium tetrachloride. Also, that diluents such as nitrogen and hydrogen may be present but precautions should be taken to avoid the presence of oxygen or oxygen-containing compounds. Obviously, the various inert gases (argon, neon, helium, etc.) found in the atmosphere may also be present, since they have no effect upon the reaction.

Although described above as applied to certain preferred embodiments, the invention is not restricted thereto. Thus, while titanium tetrachloride comprises a preferred titanium halide for use in the invention, due to its ready commercial availability and potentially low cost as compared to the other halides, such other halides as titanium tetrabromide and titanium tetraiodide are also operatively useful herein. Similarly, though temperatures ranging from 1050–1100° C. are preferred, since they yield the preferred nitride, $Ti_3N_4$, higher temperatures ranging to, say, about 1200° C. or 1300° C. can also be utilized, if desired.

The exact composition of the reaction product of ammonia and titanium halide is not important in the process and it may vary somewhat with the temperature of reaction. At ordinary temperatures it is believed to be $TiCl_4.nNH_3$ but at higher temperatures, as when gaseous $NH_3$ and gaseous $TiCl_4$ are led into a heated chamber for reaction, the nitrogen content may decrease along with the chlorine content and may even approach the compound $TiNCl$. Regardless of the composition of this reaction product it will decompose or be transformed into titanium nitride at a temperature in excess of 1000° C. in the presence of nitrogen and hydrogen-containing gases, as for instance when gaseous ammonia is led into the decomposition chamber.

The composition of the prepared nitride will depend upon the temperature of preparation and the presence or absence of reducing conditions. The titanium appears to be tetravalent in the compound $Ti_3N_4$ which is formed at lower furnacing temperatures and to be trivalent in the compound $TiN$ which is formed by subjecting $Ti_3N_4$ to more drastic temperature conditions in the presence of nitrogen and hydrogen containing atmosphere.

I claim:

1. A process for preparing a pure titanium nitride which comprises reacting anhydrous ammonia and a titanium halide while both reactants are in the gaseous phase, decomposing the resulting reaction product at a temperature above 1000° C., and in the presence of a current of nitrogen and hydrogen, and thereafter recovering the resulting nitride.

2. A process for preparing a pure titanium nitride which comprises reacting anhydrous ammonia and a titanium halide while both reactants are in the gaseous phase, decomposing the resulting reaction product at a temperature ranging from about 1050° C.–1150° C., and in the presence of a current of nitrogen and hydrogen, and thereafter recovering the resulting nitride.

3. A process for preparing pure titanium nitride which comprises reacting anhydrous ammonia and titanium tetrachloride while both reactants are in the gaseous phase, decomposing the resulting reaction product at a temperature above 1000° C., and in the presence of a current of nitrogen and hydrogen, and thereafter recovering the resulting nitride.

4. A process for preparing pure titanium nitride which comprises reacting anhydrous ammonia and titanium tetrachloride while both reactants are in the gaseous phase, decomposing the resulting reaction product at a temperature of from 1050° C. to 1100° C., and in the presence of a current of nitrogen and hydrogen, and thereafter recovering the resulting nitride.

5. A process for producing pure titanium nitride which comprises reacting anhydrous gaseous ammonia and gaseous titanium tetrachloride, decomposing the resulting reaction product at a temperature ranging from about 1050° C.–1100° C. in the presence of a current of gaseous ammonia.

CARL MARCUS OLSON.